(12) United States Patent
Olsen

(10) Patent No.: US 7,966,305 B2
(45) Date of Patent: Jun. 21, 2011

(54) RELEVANCE-WEIGHTED NAVIGATION IN INFORMATION ACCESS, SEARCH AND RETRIEVAL

(75) Inventor: Øystein Haug Olsen, Oslo (NO)

(73) Assignee: Microsoft International Holdings B.V., Amsterdam (NL)

(*) Notice: Subject to any disclaimer, the term of this patent is extended or adjusted under 35 U.S.C. 154(b) by 520 days.

(21) Appl. No.: 11/979,607

(22) Filed: Nov. 6, 2007

(65) Prior Publication Data

US 2008/0189269 A1  Aug. 7, 2008

(30) Foreign Application Priority Data

Nov. 7, 2006  (NO) .................................... 20065133

(51) Int. Cl.
*G06F 17/30* (2006.01)
(52) U.S. Cl. ........ 707/706; 707/707; 707/708; 707/723; 707/728
(58) Field of Classification Search .................. 707/706, 707/707, 708, 723, 728
See application file for complete search history.

(56) References Cited

U.S. PATENT DOCUMENTS

| | | | |
|---|---|---|---|
| 6,073,130 A * | 6/2000 | Jacobson et al. ...................... 1/1 |
| 6,633,868 B1 | 10/2003 | Min |
| 6,886,010 B2 | 4/2005 | Kostoff |
| 7,035,864 B1 | 4/2006 | Ferrari et al. |
| 7,062,483 B2 | 6/2006 | Ferrari et al. |
| 2005/0267871 A1 | 12/2005 | Marchisio |
| 2006/0152755 A1 | 7/2006 | Curtis et al. |
| 2006/0200464 A1 | 9/2006 | Gideoni et al. |
| 2008/0270380 A1 | 10/2008 | Ohrn |

FOREIGN PATENT DOCUMENTS

| | | |
|---|---|---|
| EP | 1 207 465 A2 | 5/2002 |
| JP | 2001-249943 | 9/2001 |

(Continued)

OTHER PUBLICATIONS

Abney et al., "Answer Extraction" proceedings of the Conference on Applied Natural Language Processing Association Computer Linguistics, Apr. 1, 2000, pp. 296-301.

(Continued)

*Primary Examiner* — Baoquoc To
(74) *Attorney, Agent, or Firm* — Merchant & Gould P.C.

(57) ABSTRACT

In a method for information access, search, and retrieval over a data communication system generally, wherein a query is applied to a set of documents, a result set of the matching documents and query-dependent subsections of the matching documents are identified. The method comprises computing summary information on document scopes, values and associated weights across the result sets and weighting the values with a summary value metric which provides a measure of the probability of a value. In a search engine (100) capable of supporting and implementing the above method, the search engine comprises as per se known subsystems for performing search and retrieval in the form of one or more core search engines (101), a content application programming interface (102), a content analysis stage (103) and a client application programming interface (106) connected to the core search engine (101) via query analysis and result analysis stages (105; 106). In addition the search engine (100) for supporting the above method comprises a first module (108) for specifying summary value metrics (SVMs), second and third modules (109; 110) for creating scopes and for assigning summary value metrics (SVMs) to the created scopes, and a fourth module (111) for indexing scopes, values and SVMs.

23 Claims, 7 Drawing Sheets

FOREIGN PATENT DOCUMENTS

| | | |
|---|---|---|
| JP | 2002-024144 | 1/2002 |
| NO | 20052215 | 11/2006 |
| WO | WO 00/51024 A1 | 8/2000 |

OTHER PUBLICATIONS

Callan et al., "Passage-Level Evidence in Document Retrieval" SIGIR '94, proceedings of the Annual International ACM-SIGIR Conference on Research and Development in Information Retrieval, Jul. 3, 1994, pp. 302-310.

Hearst, M.A., "TextTiling: Segmenting Text into Multi-Paragraph Subtopic Passages" Computational Linguistics, Mar. 1, 1997, pp. 33-64.

Office Action in EP 06733125.6 dated Jul. 20, 2009, 3 pages.

Office Action in EP 07021555.3 dated Mar. 4, 2009, 5 pages.

Office Action in JP 2007-288256 dated Jul. 9, 2010, 6 pages.

Office Action in U.S. Appl. No. 11/919,663 dated Nov. 27, 2009, 13 pages.

Response filed in EP 06733125.6 on Dec. 18, 2009, 20 pages.

Roberts et al., "Evaluating passage Retrieval Approaches for Question Answering" Advances in Information Retrieval lecture notes in computer Science, Mar. 2, 2004, pp. 72-84.

Salton et al., "Automatic Text Decomposition using Text Segments and Text Themes" $7^{th}$ ACM Conference on Hypertext, Mar. 16, 1996, pp. 53-65.

Supplementary Search Report in EP 06733125.6 dated Mar. 26, 2009, 6 pages.

English Translation of Office Action in Japanese Application No. 2008-509962 on Dec. 28, 2010, 7 pages.

Kinutani et al., "A Survey of Keyword-based XML Document Retrieval", Jun. 2004, 21 pages.

\* cited by examiner

202
QUERY
TORSTEIN THORSEN

203
REGION
EAST NORWAY (2)
MIDDLE NORWAY (4)
SOUTHERN NORWAY (1)
WESTERN NORWAY (7)

204
FIRST NAME
TORSTEIN (10)
TORSTEIN ALEKSANDER (1)
TORSTEIN ASGAUT (2)
TORSTEIN M (1)

205
SURNAME
THORSEN (13)
TORSEN (1)

202
RESULT LIST

YOUR QUERY GAVE A TOTAL OF 14 HITS

TORSTEIN THORSEN
SOLEIEVEIEN 9, 4100 JØRPELAND

TORSTEIN THORSEN
FJELDHAGEN 43, 4046 HAFRSFJORD

TORSTEIN THORSEN
STOVNERVEIEN 31, 0982 OSLO

TORSTEIN THORSEN
SKORVAV. 29, 5306 ERDAL

PERSONS REALTED TO "SOCCER":

| NON-CONTEXTUAL | CONTEXTUAL NAVIGATION | |
|---|---|---|
| DOCUMENT | PARAGRAPH | SENTENCE |
| 301 | 302 | 303 |
| JACK NICKLAUS (~10.0%) | DIEGO MARADONA (~4.0%) | DIEGO MARADONA (~4.0%) |
| FRED DAVIS (~10.0%) | DAVID BECKHAM (~4.0%) | DAVID BECKHAM (~4.0%) |
| BILLIE JEAN KING (~8.0%) | ALAN SHEARER (~3.0%) | FREDDY ADU (~3.0%) |
| RICHARD NIXON (~8.0%) | MICHELLE AKERS (~3.0%) | MICHELLE AKERS (~3.0%) |
| JOHN WAYNE (~7.0%) | MIA HAMM (~3.0%) | ALAN SHEARER (~3.0%) |
| MARGARET SMITH (~7.0%) | ERIC WYNALDA (~3.0%) | GEORGE BEST (~2.0%) |
| JOE FRAZIER (~7.0%) | FREDDY ADU (~3.0%) | BOBBY MOORE (~2.0%) |
| IRINA RODNINA (~6.0%) | MICHEL PLATINI (~2.0%) | MIA HAMM (~2.0%) |
| MAO ZEDONG (~6.0%) | STANLEY MATTHEWS (~2.0%) | STANLEY MATTHEWS (~2.0%) |
| GORDIE HOWE (~6.0%) | OLIVER NEUVILLE (~2.0%) | MICHEL PLATINI (~2.0%) |
| RICHARD M. NIXON (~6.0%) | BOBBY MOORE (~2.0%) | OLIVER NEUVILLE (~2.0%) |
| JOHN PULMAN (~6.0%) | FRANZ BECKENBAUR (~2.0%) | JACK CHARLTON (~2.0%) |
| QUEEN ELIZABETH II (~5.0%) | DOUGLAS HYDE (~2.0%) | LEV YASHIN (~2.0%) |

FIG.3

RELEVANCE-WEIGHTED NAVIGATION IN INFORMATION ACCESS, SEARCH AND RETRIEVAL

BACKGROUND

Information retrieval has traditionally involved the end user to formulate a query using Boolean operators—either using a query language or via graphical user interface. Execution of the query provides a search result that is a set of matching documents. This result set has generally been a classical crisp set of which a particular document is either a member or not a member.

We will throughout this invention use the term "document" for any searchable object, and it could hence mean for instance a textual document, a document represented in XML, HTML, SGML, or an office format, a database object such as record, table, view, or query, or a multimedia object.

A query Q is applied to a document set D (the search space) under the assumption that a certain subset of D, namely P, is an appropriate result for the query Q. The recall is the fraction of P returned in the result set R, i.e. IR.andgate.PI/IPI. The precision is the fraction of R that is relevant, i.e. IR.andgate.PI/IRI. Typical search systems have precision-recall curves showing a trade-off between precision and recall as depicted graphically in FIG. 1, which shows how increasing precision lowers recall and vice versa. Great precision is only achieved with poor recall and vice versa. The search system is tuned to offer acceptable precision and recall.

However, with huge content volumes where many documents share the same keywords, the result sets become too large to be efficiently presented to a human user. More recently, information retrieval systems calculate a relevance score as a function of the quality of the match between the query and the document, as well as including a priori probabilities that the document is valid for any query (e.g. page rank from Google). The search result is presented ranked according to this relevance score, showing the details of the documents with the highest relevance scores first, usually in hyperlinked pages of 10-20 documents. The concepts of recall and precision are not as clear-cut as for the crisp result sets above, but they still apply.

Recall refers to getting relevant documents included in the search result and preferably on the top of the first result page. Precision involves not having irrelevant documents on the first result page.

The user interacts with an information retrieval system (a search engine) by analyzing the search result, viewing result documents, and reformulating the query. The search result is often too general, as the user does not generally know the extent of the collection of documents in the system and thus does not make the query specific enough (i.e. having poor precision). A common query reformulation is to make a query refinement, i.e. selecting a subset of the original search result set in order to improve the precision.

Very recently, information retrieval systems have included the concept of result set navigation. As examples of published prior art, see for instance U.S. Pat. Nos. 7,035,864 and 7,062,483, assigned to Endeca technologies, Inc., and NO patent application No. 20052215, assigned to Fast Search & Transfer ASA. A document is associated with multiple attributes (e.g. price, weight, keywords) where each attribute has none, one, or in general multiple values.

The attribute value distributions are presented as a frequency histogram either sorted on frequency or value. A navigator is a graphical user interface object that presents the frequency histogram for a given attribute, allowing the user to analyze the result set as well as select an attribute-value pair as a query refinement in a single click. The refinement is instantly executed, and the new result set is presented together with new navigators on the new result set. For example, a search for "skiing" may include a "Country" navigator on the "Country" document attribute (metadata). This navigator contains a value "Norway" suggesting that there is a substantial number of documents in the result set for "skiing" that are associated with Norway. When the user selects the "Norway" option in the navigator, the system presents the subset of the "skiing" result set that is further limited to documents associated with Norway. In FIG. 2 the query 201 gives a result set 202 together with navigators on document-level metadata 203-205. In the example, a search 201 for surname "Thorsen" and first name "Torstein" allows the user to refine the first name among those in the result set (204) and to constrain the search to a part of the country (203). For each of the refinements, the size of the result set if the refinement was to be applied is shown.

Navigation includes many concepts of data mining. Traditional data mining is on a static data set. With navigation, data mining is employed on a dynamic per-query result set. Each document attribute represents a dimension/facet in terms of data mining terminology.

Formally, given a query Q, a navigator N on the attribute a having values {v} across a set of documents D has N(Q,a,v) instances of value v. The set of values for attribute a in document d is d(a).

N(Q,a,v)=|{d in D: Q matches d,v in d(a)}|

Both the attribute values v and the document hit count N(Q,a,v) are presented, typically sorted either on the values or document hit count.

Navigation is the application of result set aggregation in the context of a query where a result set summary is presented to the user as well as a query modifier that is incorporated in the query when the user selects a particular object in the summary. The presentation is a view of the result set along an attribute dimension and may include a quality indicator in addition to the attribute value, where the quality usually is the number of documents for a given attribute value or attribute value range.

The ideas discussed below incorporate both aggregation in the general case and specifically the application to navigation. The aggregation can be presented without necessarily linking it to query refinements, or it may be the basis for statistical analysis without even being presented. Also, the information retrieval system may choose to automatically select such query refinements based on an analysis of the query, the result set, and the navigators/aggregations associated with the result set.

The document-global attributes (metadata) are either explicit in the document or structured database records or automatically discovered attributes in the unstructured content of a document using techniques from the field of information extraction. In hierarchical structured content (e.g. from XML), sub-document elements can be explicitly associated with attributes.

Automatically extracted information can be associated at the global document level and at the contextual (sub-document) level, e.g. at sentence elements. The sub-document elements can be explicit in the content (e.g. paragraphs in HTML) or automatically detected (e.g. sentence detection). The distinction between attributes and elements is with respect to the visible content flow: the content of elements is visible whereas the attributes are invisible metadata on the elements. For example, the content of sentence elements is visible including entity sub-elements (e.g. person names), but the sentiment attribute on a sentence element should not interfere with the content flow, e.g. phrase search across sentences. Likewise, an entity element contains the original content while an attribute contains the normalized version of the content that is used for search and analysis. For example, the text "yesterday" is wrapped in a date entity with an attribute containing the concrete date value normalized to the ISO 8601 standard as derived from the context.

The present applicant, viz. Fast Search & Transfer ASA, has recently introduced contextual navigation, cf. NO patent application No. 20052215, on sub-document elements, e.g. paragraphs and sentences as disclosed in the above-mentioned Norwegian patent application. Entities are extracted from e.g. sentences and marked up as sub-elements of the sentence elements or as attributes on the sentence elements. The search system allows e.g. specific sentences to be selected by a query and navigation on the sentence sub-elements/attributes. For example, a query may select sentences containing "Bill Clinton" in a "person_name" sub-element and present a navigator on the "date" sub-element of those sentences. Such navigators are found to be much more relevant than equivalent document-level navigators on entities extracted from unstructured natural language content.

FIG. 3 shows aggregations of persons associated with the query "soccer" at the document X01, paragraph X02, and sentence level X03, clearly showing semantically more correct aggregations at the paragraph and sentence contexts than at the document level.

Sometimes a user will request specify a detailed query, and the result set will have too specific (or none) documents (i.e. poor recall). Some search systems allow the user to simply increase the recall, e.g. by enabling lemmatization or stemming that enables matching of alternative surface forms, i.e. matching different tenses of verbs, singular/plural of nouns, etc. Other recall enhancing measures are enabling synonymy, going from a phrase search to an "all words" search, and going from an "all words" search to an "n of m" (or "any") search. Spell checking may work either way, improving recall or precision.

In order to scale for high-volume applications, search solutions have developed from software libraries handling all aspects of the search linked into a single application running on one machine, to distributed search engine solutions where multiple, sometime thousands, machines are executing the queries received from external clients. This development allows the search engine to run in a separate environment and to distribute the problem in an optimal manner without having external constraints imposed by the application.

The basis for performance, scalability, and fault-tolerance is the partitioning of the searchable documents into partitions handled on separate machines, and the replication of these partitions on other machines. In the search engine, the query is analyzed and then dispatched to some or all the partitions, the results from each partition are merged, and the final result set is subject to post-processing before being passed on to the search client.

Performance and fault-tolerance is increased by replicating the data on new machines. The search engines scales for more content by adding new partitions.

In traditional navigation on document-level attributes, a document having a low relevance score is counted equal to a document having a high relevance score. As the relevance score generally exponentially decays along the result set list, and documents have a fuzzy membership in the result set, navigators may include query refinements where the document count may be largely from the poor relevance hits.

FIG. 4 shows the relevance profile for a sample query on a sample content collection. The non-normalized relevance score has an exponential falling profile towards a tail level. For this particular query, the tail level is reached around hit number 100. Documents from hit 100 onwards are included in the result set but with a very low effective membership.

In particular, as recall improving search features are enabled, search precision falls, but generally, the relevance mechanisms in the search engine ensures that only very high-quality new documents are included at the top of the result list. However, precision in the navigators falls more, as every new document included in the result set is included in the navigators. The content of current navigators have a bias towards recall rather than precision, potentially luring users into poor query refinements by only offering the document hit count as a measure of quality.

Clients have limited screen real estate, in particular mobile devices, but even desktops suffer from information overload as too much information is packed into the viewable area. Navigator query refinements giving poor results deteriorate the user experience by information overloading and wasting screen space that could be better used for other purposes.

The aggregation of navigation data across partitions costs network bandwidth. A partition must return the frequency count for each value in a navigator as a partition does not know which values are to appear in the final navigator. For navigators having a large value space within the result set, the network bandwidth for distributed aggregation, prior to selecting the top N query refinements to the user, is a bottleneck for getting high search throughput. In particular, the inclusion of non-relevant (low frequency) values that will not be presented in the navigator, waste network bandwidth.

FIG. 5 shows a process schematic of distributed aggregation. The content partitions X01 are aggregated by processes X02 operating on the documents within the partitions that match the query. The aggregated results are passed through the network X03 to a global aggregation process X04. The global aggregation process may contain a hierarchical aggregation distributed over multiple aggregation sub-processes. Finally, process X05 presents the navigator. Navigators that have many unique values require substantial bandwidth on network X03.

The aggregation of the navigation data is typically across the full result set. For higher performance, saving network bandwidth as above as well as CPU, it can be performed on the top N ranked hits, where N is a configuration or a per-query parameter (so called shallow aggregation). In general, the N will not match the relevance score profiles of a wide set of queries so that only "super-relevant" documents are included (ref the tail level from hit 100 onwards in FIG. 4). It will be impossible to find a general value for N or to infer the value from the query alone. Even if such an N was found, there will be a substantial range of relevance scores within the relevant documents and all documents are counted equally independent of relevance score.

However, as seen from the above navigation and navigation tools are encumbered with some drawbacks, particularly with regard to applications or refining the queries in a manner that ensures an improvement in the quality of the search result and somehow tackles the problem that derives from using inappropriate measures of quality—an obvious example would be cases where recall is preferred to precision.

SUMMARY

The present invention concerns a method for computing summary information on documents containing hierarchical named scopes comprising a plurality of associations between a scope and a value or between a scope and a value-weight pair, wherein the method comprises steps for applying a query to a set of documents, and identifying a result set of matching documents and query-dependent subsections of the matching documents.

The present invention also concerns a search engine for supporting and implementing the method of the present invention and according to the introduction of claim 24.

The method of the present invention can be regarded as an added tool or refinement applying to information access, search, and retrieval over data communication systems generally, i.e. both extranets and intranets.

Hence a first primary object of the present invention is to improve the quality of search results when navigation methods are applied to query refinement.

A second primary object of the present invention is to improve to reliability of the relation between facts returned in response to query, irrespective of whether navigation is used or not.

Another object of the present invention is to avoid information overloading, resulting from high recall, but too little relevance, and for instance resulting in overflowing of the available screen display capacity, which particularly shall be a problem when using devices with restricted display capabilities, for instance mobile devices, for searching information.

A further object of the present invention is to optimize the exploitation of the available network bandwidth and avoid congestion due to poor aggregation.

A final object of the present invention is to provide a search engine capable of supporting and implementing the method of the present invention.

The above objects as well as further features and advantages are realized with a method according to the present invention, which is characterized by computing summary information on document scopes, their values, and associated weights across the result set, and weighting the values with a summary value metric (SVM), said summary value metric being a combination of weighted statistical and dynamic properties of an attribute value, thus providing a measure of the probability of the attribute value.

The above objects as well as further features and advantages are also realized with a search engine according to the present invention which is characterized in comprising a first module for specifying summary value metrics (SVMs) to hierarchical scopes, said first module being included either in the content API or in the content analysis stage, a second module for scope creation from recognizing explicit format structures in the content, a third module for scope creation from analysis of the content, said second and third modules being included in the content analysis stage and adapted for assigning summary value metrics (SVMs) to said created scopes, and a fourth module for indexing scopes, values and SVMs, said fourth module being included in an indexing subsystem of the core search engine.

Additional features and advantages of the present invention will be apparent from the appended dependent claims.

The present invention will better be understood from the following discussion of its general concepts and features as well as from discussions that exemplify embodiments thereof by referring them to concrete applications and read in conjunction with the appended drawing figures, of which

DETAILED DESCRIPTION

The present invention applies both to the summarization of attributes associated at the document level and at the sub-document level (contextual navigation). Document level aggregation and navigation is a special case of aggregation and navigation at the sub-document level. In the following the special case of document level navigation shall first be discussed.

Rather than counting each document in a result set, this invention teaches a method and a system that weighs several static and dynamic properties associated with an attribute value and combines these into an summary value metric (SVM) and aggregates these SVMs across the result set. Typically, the SVM will be a probability or belief score for the attribute having that value.

In this invention the term weight is used for any transformation $f(x)$ of the input value x, where the linear scaling is a special case $f(x)=a*x$. For multiple inputs ($x_1$, $x_2$, $x_3$, ...), the transformation $f(x_1, x_2, x_3, ...)$ is in general a non-linear combination of the inputs.

The SVM for individual attribute-value pairs is aggregated across the result set, for example by summing the probabilities. The crucial property of any such aggregation is that there should be a bias towards the highest probabilities so that for a given attribute, the most relevant values dominate in the aggregation.

Figure 1:
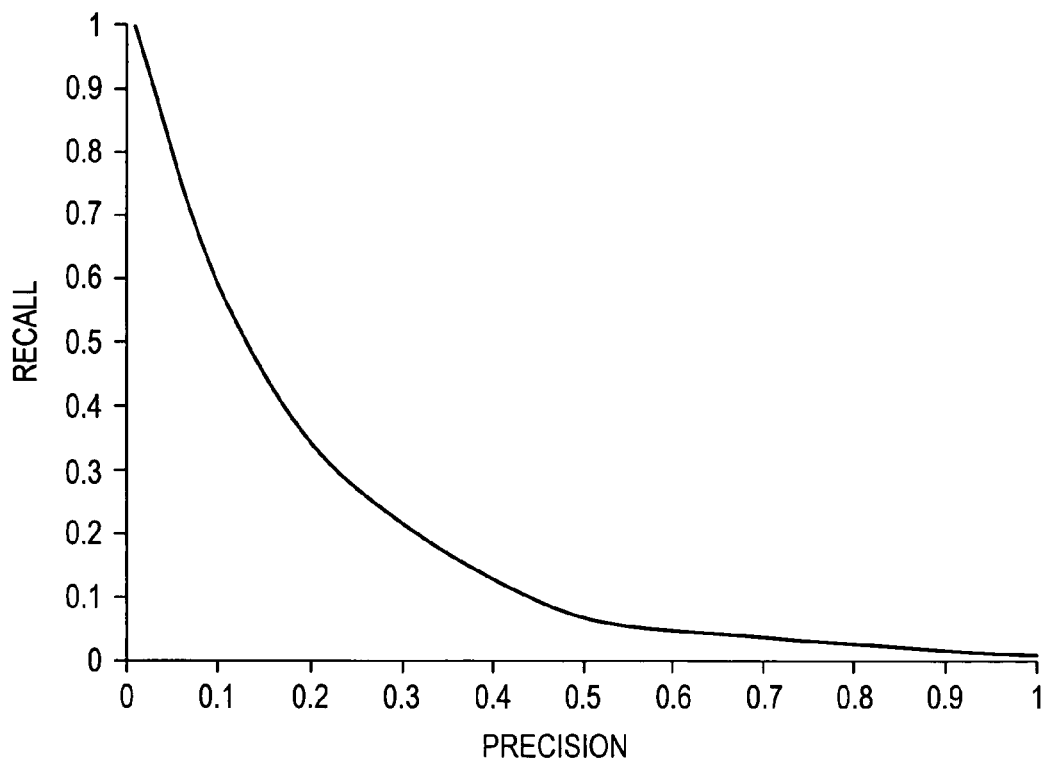
FIG. 1 shows a typical precision-recall graph, as mentioned above,
FIG. 2 a document level result set navigators, as mentioned above,
FIG. 3 contextual navigation for the query "soccer", as mentioned above,
FIG. 4 relevance profile for a query, as mentioned above,
FIG. 5 a schematic diagram of distributed aggregation as mentioned above,
FIG. 6 a scheme of mappings with weights,
FIG. 7 contextual weighting of summary value metrics,
FIG. 8 aggregation through an ontology, and
FIG. 9 schematically the architecture of a search engine according to the present invention.
Figure 4:
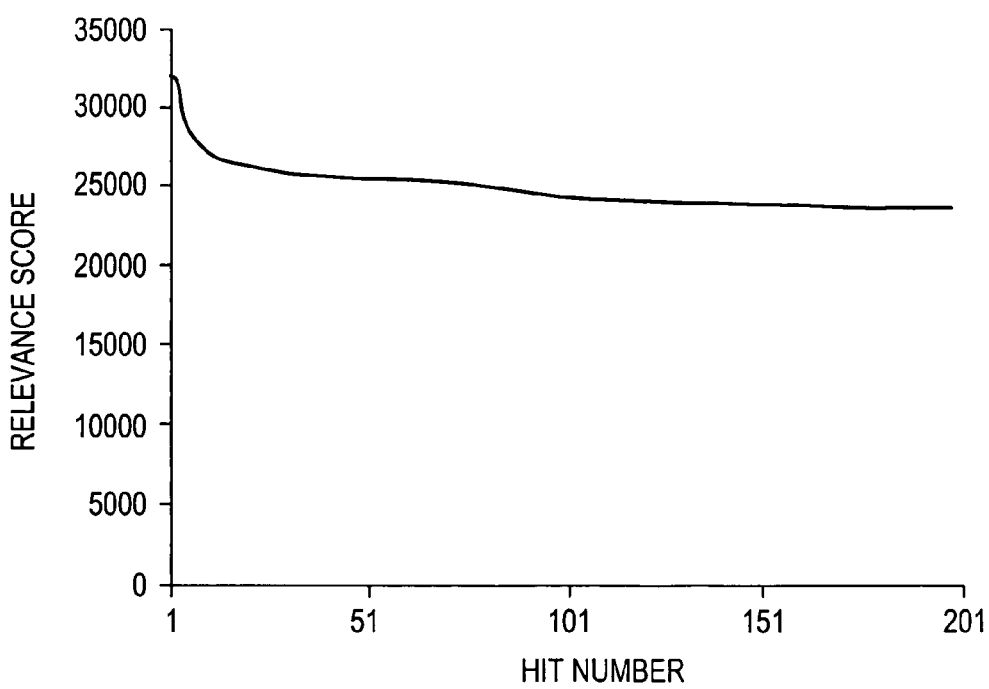

In many information retrieval systems the relevance score is not normalized. The chief purpose of the relevance score is ranking (sorting) the documents before presenting the most relevant hits, as well as indicating the relevancy in the presentation. For the relevance scores in FIG. 4, an aggregation estimates the tail level and accumulates the value above this level per unique value and in total. The fraction with regard to the total is a measure of the significance of that attribute-value pair, similar to the count used previously but now with a bias towards the most relevant documents.

Formally, the normalized relevance score for document d in the context of the query Q is $p(d)$. The probability is 0 when the query Q does not match the document. The normalized relevance score is used to weigh the accumulation of documents for the value v in the navigator on attribute a:

$R(a,v) = \Sigma p(d)$ if v in $d(a)$ [sum over all d in D]

Figure 5:
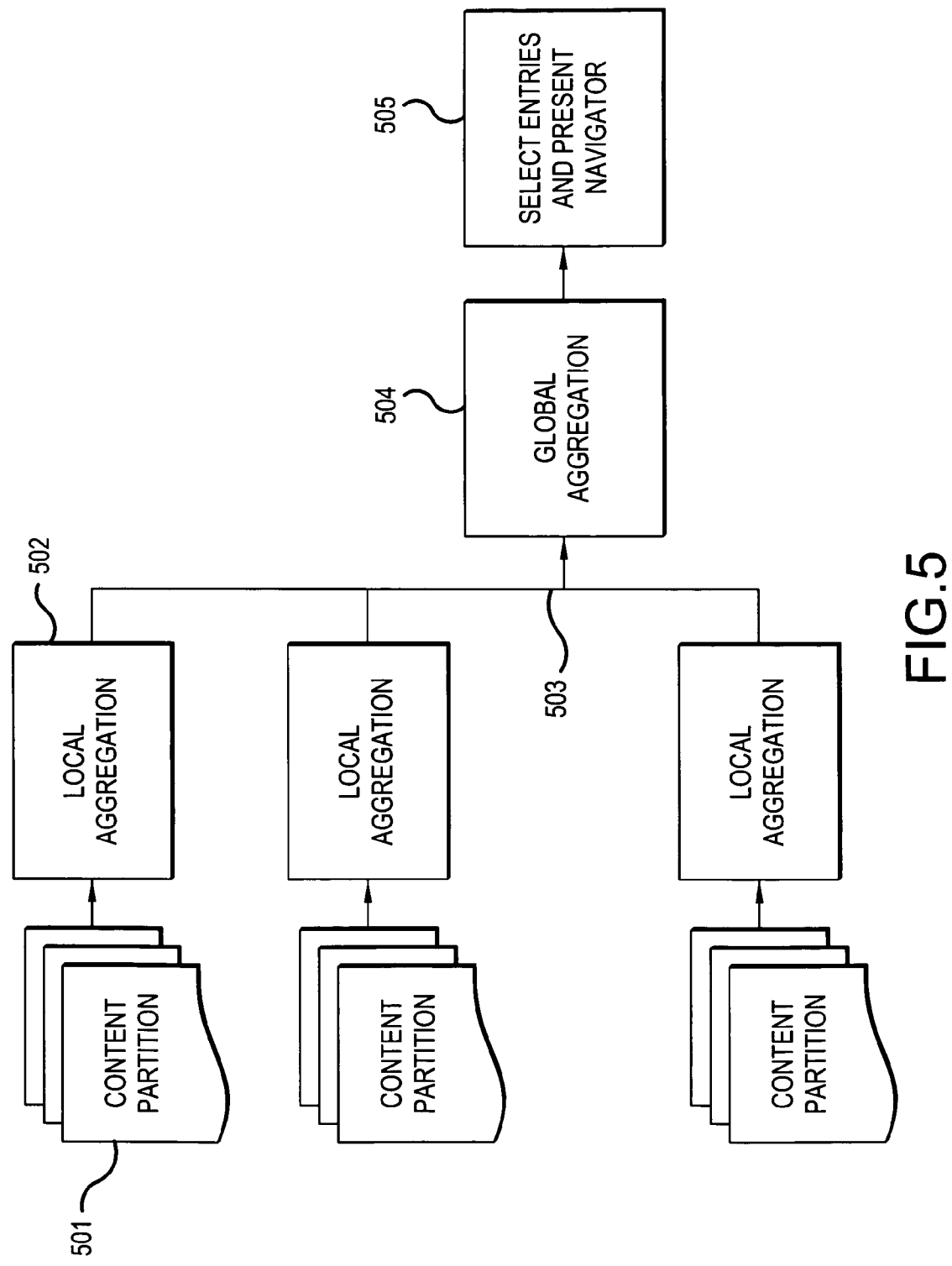

When the content is partitioned and there is an autonomous search system on each partition calculating a partial result, this partial result is merged with other partial results from the other partitions (FIG. 5). The partial results include the aggregations, but the above normalization and aggregation may require a global synchronization, in particular when there are non-linearities involved. In this case, a two-pass protocol may be required where the partitions first calculate the result set and some aggregation parameters which are centrally processed before the partitions calculate the final aggregations.

In the special case of accumulating relevance scores above the tail level, a one-pass protocol is sufficient where a (value, relevance score sum, count) triple is returned for every unique attribute-value pair. The global relevance score tail level is estimated when merging the partial result sets. As the attribute aggregations are merged, the global tail level times the hit count is subtracted from the relevance score sum. In order to normalize the aggregations, the partial results sets can also contain the (relevance score sum, count) per attribute across the partial result set. This allows the global relevance score sum above the global tail level to be calculated and used for normalization. The traditional exact hit count is still available in the protocol.

For exact counts, all attribute values must be included in the global merge as an attribute value having a very small count may be a top ranked value globally. Multi-pass protocols where the global merger requests statistics on particular attribute-value pairs reduce the aggregation bandwidth at the cost of slightly increasing latency.

When the values within an aggregation are ranked according to a relevancy score, the value is intrinsically fuzzy. In contrast to exact counts, the value cannot be easily verified and there is room for some error. An aggregation can be associated with some error constraint such that the number of aggregated values required to satisfy the error constraint is less than for exact counts. In particular, given a maximum error e each partition can drop attribute values with a relevance score of less than e/N where N is the number of partitions. In order to cut off an attribute aggregation on global relevance scores, a two-pass protocol may be required where the global relevance scores are calculated in the first pass (e.g. the tail estimation) and the local aggregations are performed subject to global relevance scores. When specifying the number of the highest-ranked documents to use for aggregation (i.e. shallow aggregation), the same method can be used to estimate the error per aggregator. The presentation of the aggregations may indicate the error or simply drop aggregations with too high error.

A document may not only be associated with one or more values for a given attribute, but also with a fuzzy membership score, e.g. a probability of having that particular value p(d,a,v). This is an a priori weight assigned during document pre-processing or via the client pushing the content, priori to enabling the document for search. The aggregation takes both this attribute value weight into account as well as the overall (normalized) document relevance score via the function f e.g. aggregating via the sum:

R(a,v)=.SIGMA.f(p(d),p(d,a,v)) if v in d(a) [sum over all d in D]

The function f will also take into account other objects of the result set, other attributes, additional operators, or other aggregators as described in the following section where the system and methods above are generalized to be applied to hierarchical documents and queries.

The weights p(d,a,v) can for example be derived from a classification process, for example assigning languages of the document d to the attribute a. Table 1 shows the non-normalized probability scores for language detection on 4 sample documents. There are clearly ambiguities in detecting the two Norwegian languages "nb" and "nn", Swedish ("sv"), and Danish ("da"). Rather than doing a hard a-priori classification, the search and aggregation quality improves by taking the uncertainty along to the matching process and the aggregation.

TABLE 1

| Language detection scores | | | | | | |
|---|---|---|---|---|---|---|
| Document 1 | nb: 62 | nn: 57 | sv: 34 | de: 26 | et: 21 | da: 20 |
| Document 2 | nb: 95 | da: 94 | nn: 73 | sv: 48 | en: 12 | |
| Document 3 | nb: 86 | nn: 73 | da: 45 | sv: 32 | nl: 12 | en: 12 |
| Document 4 | nb: 83 | nn: 75 | da: 55 | sv: 38 | en: 16 | nl: 11 |

Each language associated with the document is put into the value v together with the probability of that language as p(d,a,v). Multi-lingual or ambiguous documents can for example be assigned the following values in the "language" attribute {("en", 0.9), ("ja", 0.2)} and another document have the value {("en", 1.0)}. The aggregation (via sum) of these two documents over the "language" attribute will be {("en", 1.9), ("ja", 0.2)}. As the user selects a language, e.g. "en", the result set may either be subject to a language filter, selecting the sub-set of the result set that has an "en" score above some threshold, or boosting documents according to their "en" score. The relative weight of the "en" boost can be determined from analyses of the relevance statistics of the result set and the language navigator.

Any feature extraction is associated with uncertainties and probabilities. The present invention handles these probabilities by aggregating the probabilities and presenting the aggregate to the user, rather than making hard binary decisions and aggregating these binary values. Feature extraction for information retrieval includes for example language detection, topic classification, image analysis, sound analysis (e.g. speech to text), and video analysis.

Getting an overview of document scopes associated with a particular query are highly valuable for refining the search to see the literal contexts in which there is desired information, as well as allowing one to deduct facts associated with the query. This can be done by resorting to contextual navigation, i.e. using the context of the initially returned information. The quality of such contextual information is higher when applied to sub-document content elements, as will be evident from the following discussion.

The present invention also applies to hierarchical content (e.g. represented as HTML, XHTML, and XML in general) and queries (e.g. in XPath and XQuery including the full-text extensions). The representation of the document in this case can be the XML data model [http://www.w3.org/XML/Datamodel.html], i.e. hierarchical named elements, where an element can have literal content, sub-elements, and named scopes. The document model previously referred to is a special case where the document has a set of named elements (typically used for free-text search and retrieval) and a set of named scopes used for search, aggregation, and retrieval.

The distinction between element and scope is rather coincidental. When referring to attribute values, attribute aggregation, and attribute navigation in this invention, we include both top-level attributes with document scope, attributes on sub-document elements, and also sub-document elements. It is for example perfectly possible to aggregate on person names within sentences, where the person names are elements within the literal content of sentence elements. The invention teaches aggregation on both elements and attributes, and any specific wording below implies both. The term scope will be used herein to include both elements and element attributes.

An information retrieval system tokenizes the literal content of string scopes, i.e. splits the content up into searchable atomic units, tokens, as perceived by human users. For western languages, these units are approximately at the word level, making the content matching insensitive to punctuation, etc. Some languages do not have explicit separation of such tokens and require context sensitive methods. The content throughout the structure has a monotone increasing position (e.g. character position and token position) that is not affected by element attribute content.

A query containing multiple constraints, in the forms of either predicates selecting token or scope occurrences, can calculate a relevance score that includes the distance between the matches. The distance can be defined in terms of straightforward positional distance in the content, e.g. token distance. The proximity relevance score can be implicitly included e.g. for AND and OR operators or included in explicit proximity operators, e.g. searching for "to" NEAR "be". Explicit proximity operators can match insensitive to the order of the arguments but still differentiate the relevance score on the order, i.e. the relative distance may be negative. Implicit proximity relevance can also depend on argument order (e.g. the AND operator).

The query specifies structural document scopes in which a set of predicates are to be evaluated. There is a query evaluation context for every matching such scope that includes relevance scores, positional information, element semantics, element statistics (e.g. number of such elements globally and per document), the size of the element, the predicates/operators applied in the context, specifically the term predicates in the context including relevance statistics—e.g. the number of terms present in the context globally, in this document, etc. A query context is associated with a document scope, i.e. the scope at which the predicates within that context applies. For example, a query with predicates within a sentence has a sentence query context which can refer to other scopes with regard to the sentence (e.g. axes in the XPath specification). Each scope value is associated with an a priori relevance score (weight) to be used when aggregating the scope values. A query context also includes the ancestor query contexts as specified in the query. In particular, the global query context, including the global document attributes, is available from every query evaluation context.

A query may define soft relevance predicates for aggregation only in addition to those that defines the selection criteria. For example, select all sentence scopes containing "said" and a company scope, calculate a relevance score including the positional proximity of these two constraints, aggregate the company values weighted by the relevance score and give an additional boost to company values containing "Inc".

During contextual navigation and in particular fact finding, the positional proximity of the information often corresponds to the degree of semantic association. Proximal concepts usually have higher degree of semantic association. However, an absolute distance limit is hard to determine. It will depend on the nature of both the content and the query. Some concepts are present in verbose discourse (broad contexts) while others are in terse lists (narrow contexts). The challenge is to choose an optimal context that is broad enough for getting sufficient data to get statistical evidence while it is narrow enough to include predominantly relevant associations. Thus, the precision-recall tradeoffs originally considered for the result sets now becomes crucial for good quality contextual navigators. In the case where a user is interested in what entities and entity values are associated with some other predicate, the user does not specify a context. It will be up to the information retrieval system to select a suitable context for finding such relevant associations.

When imposing specific token distance proximity predicates for matching and weights for aggregation, it can be hard to anticipate a distance in terms of characters or tokens/words. In many cases specifying the distance in terms of document scopes fit the task at hand closer and makes it easier to specify the match and weighing as well gives more exact results. For example, a query may search for two predicates within five sentences and specify aggregation weights on one of the predicates as a function of how many sentences the predicates are apart. Another example, aggregate noun phrases within three sentences of the location "Oslo" weighed by the number of in-between noun phrases.

Another distance measure between two predicates is the aggregation of scopes selected by another predicate. This distance measure can be used for weighing the aggregation of a noun phrase where the noun phrase is to appear after "Oslo" in a sentence and the weight is function of the sentiment attribute of the in-between adjective scopes.

In order to find high quality associations one can search and aggregate (i.e. calculate a navigator) in a narrow context first, e.g. at the sentence level. If there is sufficient evidence there, present it to the user, otherwise try a slightly broader context, e.g. at the paragraph level. If there are still not sufficient matching paragraphs, then resort to applying the query across the full document and use global document-level attributes.

Another method is to specify the context width in terms of token positions, e.g. first try with a gap of 5 tokens between the predicate and the scope to be aggregated, then increase the gap until sufficient data is aggregated and present it to the user.

When the proximity contributes significantly to the relevance score, a wide context can be used in the first attempt with the proximity distance modulating the aggregated values, thus achieving a bias towards the most relevant associations. In this scheme it is unlikely to require a subsequent broader search. However, when the context increases stepwise to get sufficient data, either in terms of structural elements or in terms of position distance, the aggregation can combine the data at the various levels weighing the narrower contexts higher than the broader ones. This kind of aggregation should analyze the nature of the results at each level and determine an appropriate method for combining the aggregated values. Combining data on this basis, i.e. by taking into account hierarchies and levels of data, is termed metaaggregation and shall be discussed in more detail below.

The weighing of scope values can depend on other scopes where the relation is specified in the query. For example, the aggregation of a person name can, in addition to other relevance metrics, also be weighted by sentiment on the parent sentence so that person names in positive contexts are weighted higher (assuming a numeric value on the sentiment). The weighing includes a mapping of the values so that textual content can also be used for e.g. weighing person names by the title associated with each name. Such aggregations can also be made on indexing-time calculated weights associated with the scope values. This method may offer higher performance but will suffer from lack of flexibility with regard to defining such aggregation at query time.

Conceptually, one can also weigh scope values by relevance inferred from other navigators (aggregations really, as the query refinement options are not required). For example, the price range can weigh the color such that any color is more relevant if the price is low, but for high price one wants exact color. As above, the same predicates can be applied to the context level, e.g. sentence or token proximity, but if there is insufficient data to gather proper evidence for a weighted color aggregation, the price aggregation weighs the color according to the result set distance on price (where the price aggregation can also be weighted).

Traditionally, the query refinements during navigation have been the selection and de-selection of result subsets essentially altering a filter constraint in the query that does not apply any relevance score, only implicitly by using a different set. With the current invention, the aggregation and navigation experience can be "softer" using query refinements that add (or remove) soft constraints to the query rather than crisp filtering operators. For example, a query refinement can add an and-like operator of the original query and a soft navigation predicate in an inference network or a fuzzy logic. The original query and the added navigation predicate are weighted according to an analysis of the result set and the navigator. For example, the weight of the navigation predicate would be higher and more restrictive for a huge result set than for a small one. For small result sets, it could effectively be a re-ranking of the hit list. Note that with the current invention, a query refinement changing the relevance of a result set may achieve the same effect in a navigator as traditional crisp filtering.

It should be noted that the summary value metric (SVM) may be calculated based on the custom code defined in the query, e.g. in terms of Java code. For instance, the Java code may specify that aggregation is to on the lower case values, and the SVM per values increased if upper case characters are present in the value. The query may also specify custom aggregation on the values and the SVMs. For example the custom code may aggregate unique values within a document, selecting the maximum SVM per unique value. Other languages may be used, e.g. XPatch or XQuery, including XQuery full text or ontology languages.

The content can be diverse and adhere to a large number of schemas. Some information retrieval systems allow the content to be ingested without the need for normalizing to specific search schemas. The task of defining mappings of each of the content schemas to particular search schemas is huge and never-ending. The search schemas and the mappings are bound to change as the search application evolves. Defining the mappings at query-time gives more flexibility. The current invention allows the aggregation across multiple schemas to take into account the semantic distance between named scopes to be included and mapped to the search schema. The mapping can be either done in advance, associating the values with the semantic distance (as a weight), or at query-time. For example, the following scopes in the content can be aggregated into "name" in the search schema weighted by the semantic distance: ("customer", 0.5), ("person name", 1.0), ("accountholder", 0.8), ("owner", 0.7).

Figure 6:
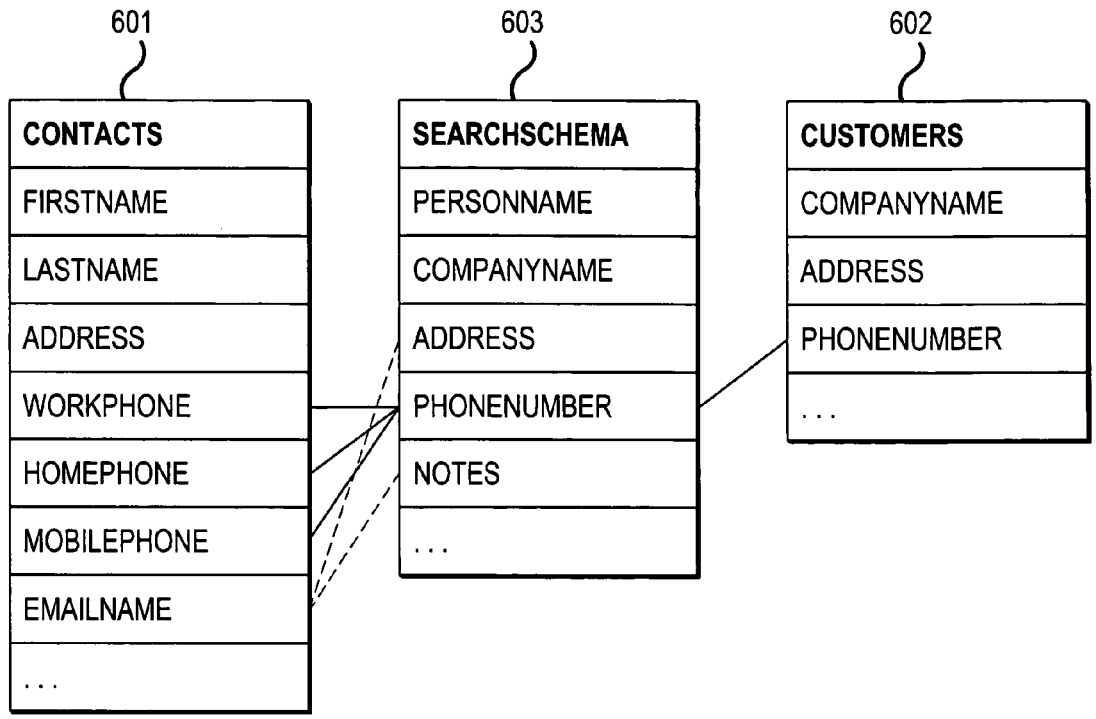

FIG. 6 shows the mapping—either pre-indexing or at query time—of content schemas "Contacts" X01 and "Customers" X02 to a search schema "SearchSchema" X03. In the "Contacts" schema X01, the "WorkPhone", "HomePhone", and "MobilePhone" fields are all mapped to the "PhoneNumber" field in the search schema X03 (red lines) but with different weights taking e.g. into account penalties of contacting a person at home or at work, depending on whether it is a private or business contact. FIG. 6 also shows the mapping of "EmailName" in "Contacts" X01 to multiple fields in the search schema X03 (green lines), each with different weight. The weights associated with bi-directional mapping ambiguities are used both for matching and ranking the hits in the search result list, as well as when aggregating values. Search and the aggregation are with respect to a search schema that is relevant for the use case. There may be several search schemas to match multiple use cases. The search schema X03 may be a logic one in that the query is expanded to cover the physical schemas X01 and X02 present in the information retrieval system, e.g. in XML representations. Alternatively, the information in the system can be normalized at pre-indexing time to search schema X03 and stored in that representation. A mixture of the two alternatives offers trading flexibility versus performance per field in the search schema.

When discovering facts and knowledge, i.e. looking for strong associations in the content of selected documents in the information retrieval system, it may be of interest to merge the (scope, value) associations across all scopes and sort on a decreasing relevance metric. The set of scopes to merge can be defined in the query, possibly being across all aggregations.

The current invention also applies to co-occurrence mining, e.g. of person names and dates in sentences containing "born". In this case, the benefit of weighing will give better associations between persons and birth dates. For example, noun phrases between the person and "born" could weight the association down so that sentences of the form "Bill Clinton's wife was born on Oct. 26, 1947." will not make a strong association between "Bill Clinton" and the date.

Figure 7:
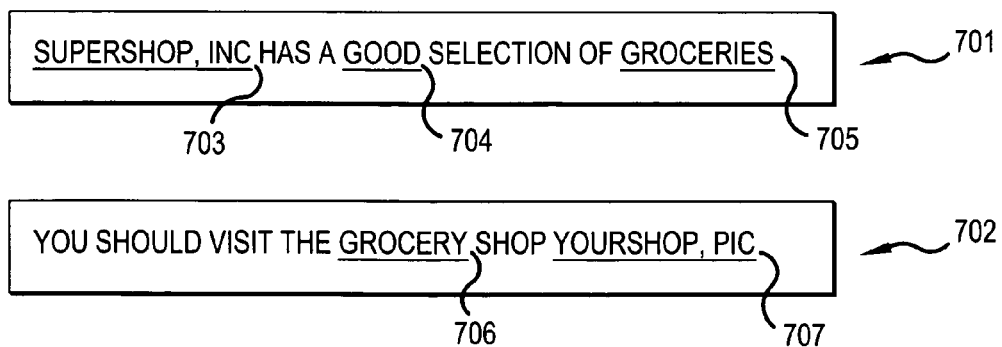

FIG. 7 shows two sentences X01 and X02 with company names highlighted in green, grocery (or linguistic variants) highlighted in red, and adjectives highlighted in yellow. Sentence X01 contains the company name X03, the adjective X04, and "groceries" X05 that is associated with the base form "grocery". Sentence X02 contains "grocery" X06 and the company name X07. A query specifies an aggregation of company names within the same sentence as "grocery" while boosting those companies that contain "Inc".

The SVM can thus be made to respond to a token or word positional or visual in the proximity in the documents between predicates in the query or similarly a character positional proximity in the document between predicates in the query. Measuring proximity by token distance will not necessarily represent visual distance between tokens. Some tokens are longer than others, punctuation, characters occur in line and the layout may include e.g. tables that separate the tokens. The visual distance between e.g. tokens and entity scopes may be included in the summary value metric SVM. When aggregating persons co-occurring with the token "born", "person" scopes appearing visually close to "born" is to be preferred. For instance two paragraphs ... in 1953, the house was taken over by John Smith.
Born in 1965, Julia Smith . . . .

where the first paragraphs ends with the person scope and the subsequent paragraph starts with a token "born", the person scope and the token "born" are adjacent in terms of token proximity, but visually as semantically are further apart. In order to provide a reduction in the SVM in this case paragraph scopes may be associated with an implicit token separation. A more advanced method is to derive the token separation from the visual layout in the document format, e.g. by interpreting the HTML. Another method is to associate the visual position in parallel with the token positions such that the visual distance between matches in the content can be calculated as the query is evaluated. The company name X07 in sentence X02 gets a higher weight than the company name X03 in sentence X01 due to better token proximity score and exact linguistic match. Linguistic variants can have a lower weight in case semantic ambiguities are introduced. On the other hand, the company name X03 gets an additional boost for containing "Inc", as specified in the query. Furthermore, the query may specify aggregation over sentiment on in-between adjectives, such that adjective "good" X04 provides a boost on company name X03.

The aggregation can also be sensitive to contexts above the document level. A dominant number of documents within the same node in a hierarchical taxonomy can be somewhat down-weighted to the benefit of evidence from a wider range of documents. The taxonomy can be associated with weights so that the aggregation e.g. weighs scope values from documents in the "News" category higher than value from documents in the "Travel" category. Examples of such taxonomies are URLs (with levels such as domains, web sites, and directories), conceptual categories, explicit classification such as product hierarchies, etc.

The support for such taxonomies can be generalized to ontologies, for example defined in ontology languages like OWL, RDF/RDFS, OIL, DAML, DAML+OIL, KIF, OCML, LOOM, KM, F-Logic, OKBC, and CycL (and more). Ontologies as applied in the present invention shall be discussed in more detail below.

Reasoning rules can be defined (e.g. in the languages above) that deduce the relevance weights of scope values given a document that may be partially associated to several objects in the ontology. In terms of conceptual classification, a document may belong to both "Travel" and "News" but with different probabilities. These a priori probabilities also contribute to the scope value weights above.

An ontology can also map a value to be aggregated to multiple candidate values each associated with a weight. A "foodkind" scope may have the value "Granny Smith" and be mapped to "apple" and "fruit". The weights may be determined by inference rules for the ontology that may also take into account document and result set properties. In the simplest case, the weights are determined from the semantic distance in the "is-a" relationships within the ontology. Thus, let's say the value "Granny Smith" carries the a priori weight 0.9 in the document, the "Granny Smith is an apple" relation has a weight 0.9 and the "apple is a fruit" relation has a weight 0.8. With simple aggregation of weights, the "foodkind" navigator is fed three (value, weight) pairs: ("Granny Smith", 0.9), ("apple", 0.81), and ("fruit", 0.648).

Figure 8:
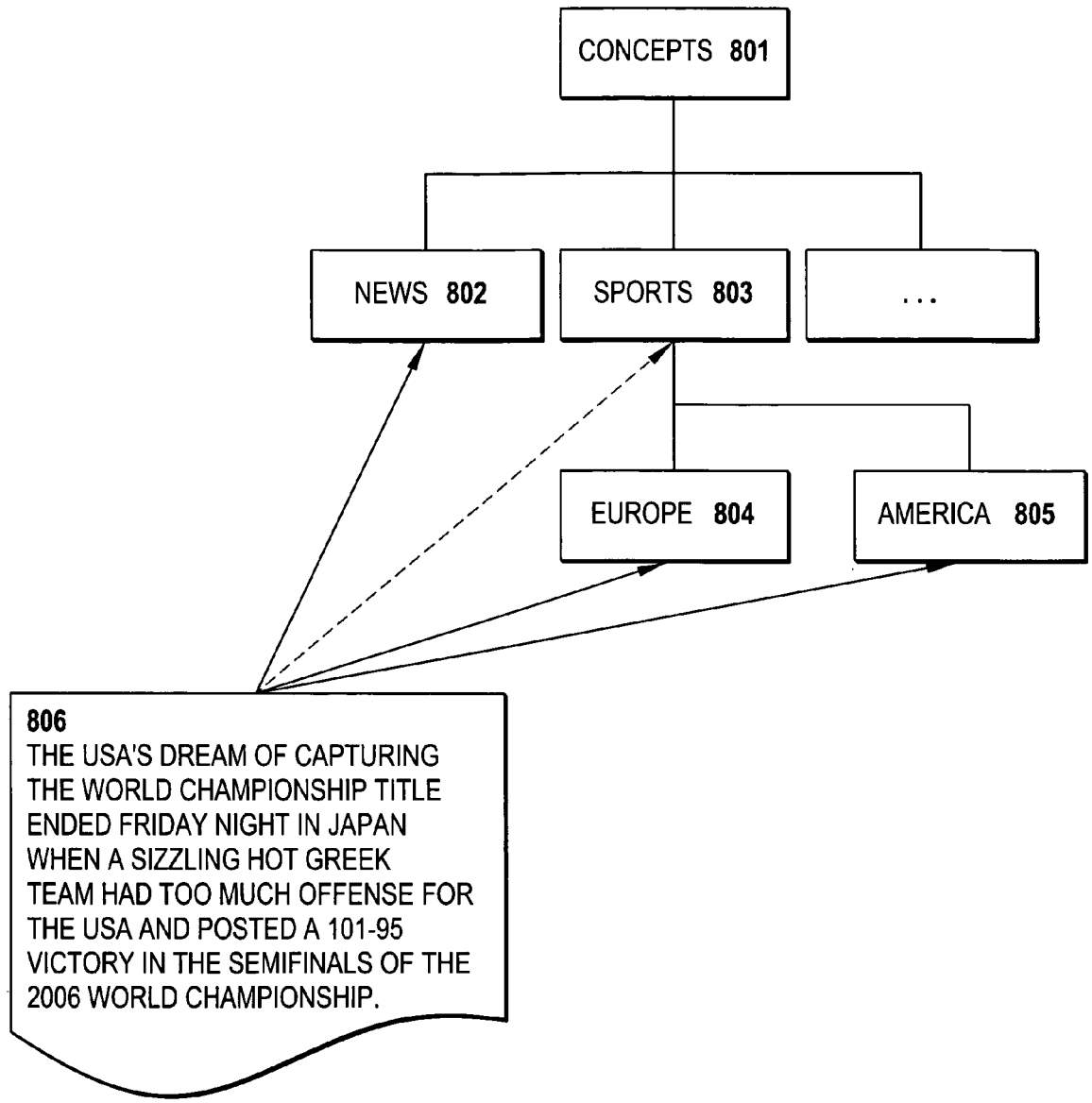

FIG. 8 shows the aggregation of concepts in a document X06 associated with an ontology X01. The document X06 is associated with different strengths to the nodes X02, X04, and X05. Within the ontology, node X05 is more strongly associated with node X03 than X04 is associated with node X03, e.g. on the basis of user profiles. There are more frequent visits from users interested in American content. The weights from document X06 propagate via the paths X04-X03 and X05-X03 to the node X03 such that it has an aggregated weight of all incoming paths (indicated with the dashed line). Thus all nodes X02, X03, X04, and X05 are included in the aggregation when matching document X06.

The summary information can be computed with supervised or unsupervised clustering on the basis of multiple scopes. Supervised clustering can be regarded as akin to classification, i.e. the use of taxonomies taking into account scope values for various document levels. As already mentioned taxonomies can be generalized into ontologies, allowing rules to be defined for conceptual classification wherein a document can be associated with different levels and hence different probabilities for various values, as discussed hereinabove. Performing clustering on the basis of multiple scopes, the weight associated with each scope is to be included in the clustering process. For example, the "title" scope may have a higher weight than a "body" scope, and thus the tokens in the "title" should contribute more to e.g. the document vector. Also entity subscopes may provide further boosting within each of the "title" and "body" scopes. In the clustering process each document may be made of one or more clusters, each associated with a cluster membership score, e.g. vector similarity measure between the document vector and the cluster center vector. This score can be used as a summary value metric in terms of aggregating scope names and scope values. Some exemplary embodiments of the present invention shall now be given in terms of specific applications thereof.

EXAMPLE 1

A first embodiment of the present invention is within Internet search applications, for example vertical search, local search, and global Internet search. The sheer content volume of such applications and the typical lack of search expertise of the users, given by the services are used by the general public, require the system to provide aids in returning relevant information. The present innovation allows a web page analysis to for example weigh concepts and metadata by the visual presentation, focusing on information in highly visible fonts, and reduce the contribution from text in menus found on many pages similar to relevance calculations on terms based on inverse document frequency. An analysis of the hyperlink structure of the content can for example weigh the referring anchor texts of a page in an anchor text navigator. Page views as a consequence of queries can be used to associate the query with the pages viewed. An analysis of this query traffic can provide weighted associations, e.g. based on popularity over time, current trends, popularity within a group of other users where one can weigh the users. An analysis of user traffic for general page views can provide a priori document relevance that applies to all metadata. A concept navigator can take weighted input from several sources, including the examples above.

EXAMPLE 2

A second embodiment of the present innovation is within the field of search in e-commerce application including e-tailing and Internet shopping. For example, an mp3 player is stronger associated with the manufacturer than the battery for that mp3 player, such that the query "mp3" gives a manufacturer navigator that is biased towards manufactures with many players rather than many batteries. The weight may simply be the price, but can be refined to include the overall sales numbers, not just from search. Weights on values in product navigators can also be derived from reviews and set by business rules—for example on product expiry dates, product profitability, and campaigns. Weighted associations between products and concepts derived from the text in the queries can be established from these data, similar to the Internet search applications above. The weights of suggested product categories, manufacturers, models, and features like color and size, can be inferred from the user traffic. As different product types have different characteristics they will have different content schemas with respect to search. As these schemas are normalized to offer a general search schema for the end user, the mapping of product-specific fields to the search schema fields may be fuzzy. This fuzziness can be carried through to the navigation on the search schema fields. Values for semantically good mappings are weighted higher than for mappings where there is unclear semantic correlation.

Table 2 shows a sample product database for use in an e-commerce setting listing 5 products that matches the query "mp3". A traditional navigator on Manufacturer returns 3 hits for "Sanyo" and 2 for "Creative" and thus would rank the "Sanyo" entry higher than the "Creative" entry. The present invention allows the vendor to weigh the Manufacturer navigator with for example Price such that "Creative" would be ranked higher than "Sanyo", and it is likely that this would make a better user experience and improve the profitability of the vendor.

TABLE 2

Hits on query "mp3" in a sample product database

| Product | Manufacturer | Price (USD) |
|---|---|---|
| 1800 mAh battery for mp3 players | Sanyo | 59.00 |
| 1100 mAh battery for mp3 players | Sanyo | 48.00 |
| Battery charger for mp3 players | Sanyo | 35.00 |
| Zen Micro mp3 player | Creative | 345.00 |
| Zen Neeon 2 mp3 player | Creative | 452.00 |

EXAMPLE 3

A third embodiment of the present invention is within the area of knowledge discovery and text mining, for example patent search. The users are typically subject-area experts and require extreme precision in their search results. The challenge is to associate a query with navigators giving a qualitative measure of the query and the result set, as well as providing query refinements that will provide more precise information. There are already techniques for associating documents with metadata, and associating a query with navigators on the metadata of documents within the result set of the query. International patent application No. PCT/N006/000165, assigned to the present applicant, computes navigators on metadata associated with query-time selected subdocument entities and is shown to provide much higher precision in the navigators. In both cases, the navigators are based on the frequency of the metadata. The current invention changes the associations between query and metadata from being binary relations to being a weighted relation where the weight can be evaluated at query-time. In this embodiment applied to patent search, the weight can for example be based on the claim structure such that concepts in independent claims, in particular the first claim, are weighted higher that concepts in e.g. the background of the invention, thus giving better precision in identifying the inventive step in the patent. The extraction of knowledge, e.g. in the form of predicates, is inherently probabilistic, and the present innovation allows this uncertainty to flow through to the summarization. Filtering these probabilities on thresholds will reduce the quality of the summaries.

EXAMPLE 4

A fourth embodiment of the present innovation is the application on multimedia objects including files and streaming broadcasts containing music, video, speech, and photographs. For example, popularity measures within social networks can provide weights on genre, artist, and song, such that an overview of the past activity and current trends includes these weights. Feature extraction is often applied to multimedia in order to augment the object with global and context specific metadata (e.g. per scene in a video stream). The extracted features are associated with probabilities that the present invention takes into account in the summarization. For example, a speech-to-text conversion assigns probabilities to phonemes and words detected in the media stream, and a face detection system assigns probabilities to each of the detected faces.

In addition to the examples of certain desirable and useful applications of the present invention, a person skilled in the art will easily realize that the invention also can be embodied in applications extending beyond information access, search and retrieval as performed in conventional information access on search systems, e.g. in an enterprise search system the summary value metric could be set with the intention of achieving specific operational goals within a business enterprise. It is also possible to make the summary value metric SVM responsive to advertisement bids, and these could specifically include a bid value and/or expected advertisement revenues.

A general system for information access, search, and retrieval wherein the method according to the present invention shall be applicable, can advantageously be embodied in a search engine according to the present invention.

Figure 9:
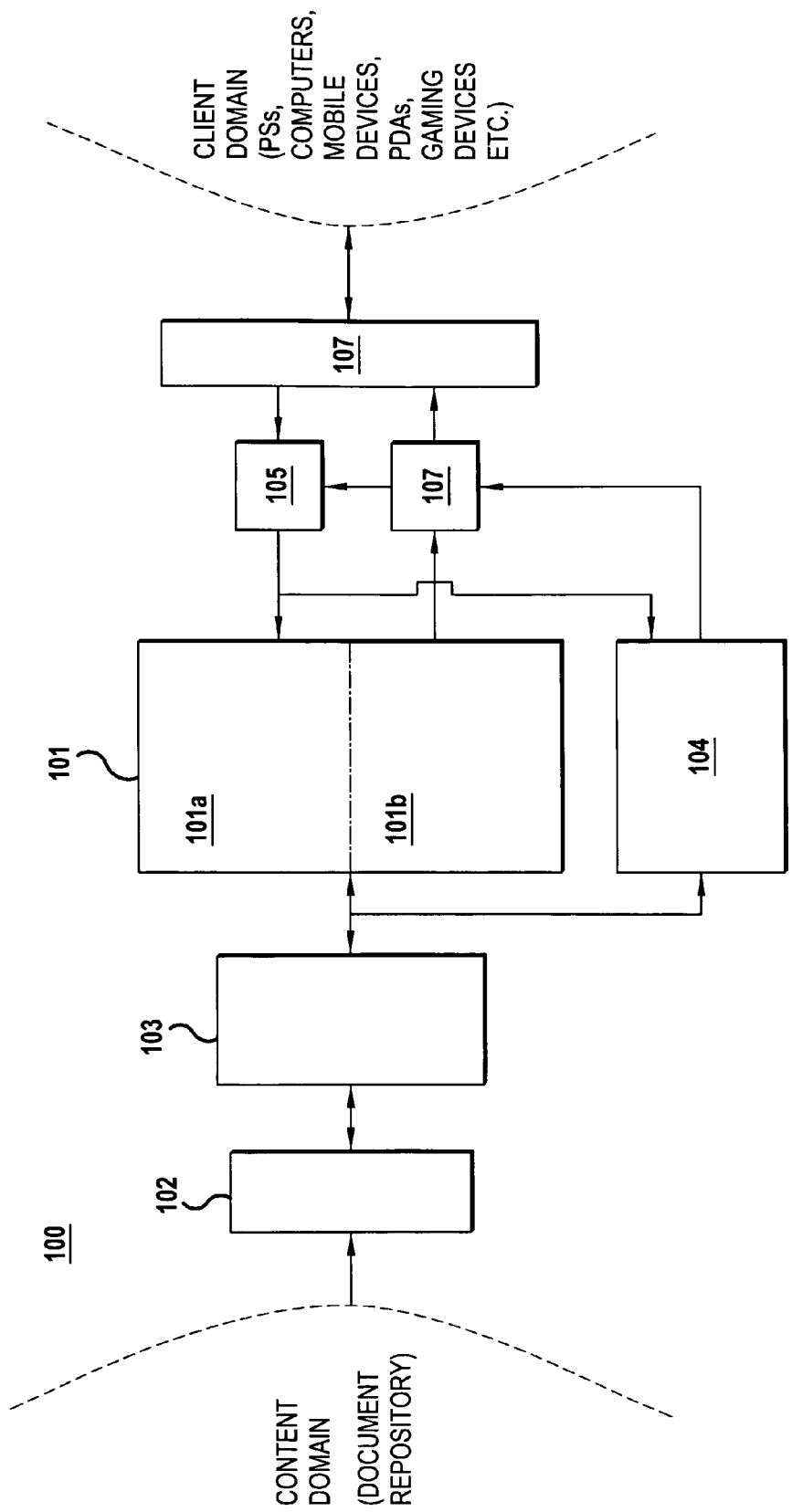

In the following a search engine adapted for supporting and implementing the method of the present invention shall be discussed in some detail. In order to support and implement the method of the present invention further components or modules are provided, and shall be described with reference to FIG. 9.

The search engine 100 of the present invention shall as known in the art comprise various subsystems 101-107. The search engine can access document or content repositories located in a content domain or space wherefrom content can either actively be pushed into the search engine, or via a data connector be pulled into the search engine. Typical repositories include databases, sources made available via ETL (Extract-Transform-Load) tools such as Informatica, any XML formatted repository, files from file serves, files from web servers, document management systems, content management systems, email systems, communication systems, collaboration systems, and rich media such as audio, images and video. The retrieved documents are submitted to the search engine 100 via a content API (Application Programming Interface) 102. Subsequently, documents are analyzed in a content analysis stage 103, also termed a content preprocessing subsystem, in order to prepare the content for improved search and discovery operations. Typically, the output of this stage is an XML representation of the input document. The output of the content analysis is used to feed the core search engine 101. The core search engine 101 can typically be deployed across a farm of servers in a distributed manner in order to allow for large sets of documents and high query loads to be processed. The core search engine 101 can accept user requests and produce lists of matching documents. The document ordering is usually determined according to a relevance model that measures the likely importance of a given document relative to the query. In addition, the core search engine 103 can produce additional metadata about the result set such as summary information for document attributes. The core search engine 101 in itself comprises further subsystems, namely an indexing subsystem 101a for crawling and indexing content documents and a search subsystem 101b for carrying out search and retrieval proper. Alternatively, the output of the content analysis stage 103 can be fed into an optional alert engine 104. The alert engine 104 will have stored a set of queries and can determine which queries that would have accepted the given document input. A search engine can be accessed from many different clients or applications which typically can be mobile and computer-based client applications. Other clients include PDAs and game devices. These clients, located in a client space or domain will submit requests to a search engine query or client API 107. The search engine 100 will typically possess a further subsystem in the form of a query analysis stage 105 to analyze and refine the query in order to construct a derived query that can extract more meaningful information. Finally, the output from the core search engine 103 is typically further analyzed in another subsystem, namely a result analysis stage 106 in order to produce information or visualizations that are used by the clients.—Both stages 105 and 106 are connected between the core search engine 101 and the client API 107, and in case the alert engine 104 is present, it is connected in parallel to the core search engine 101 and between the content analysis stage 103 and the query and result analysis stages 105; 106.

In order to support and implement the present invention the search engine 100 as known in the art must be provided with certain modules 108-111. A first module 108 is usually provided in the content API 102 in order to specify summary value metrics to hierarchical scopes. Alternatively this first module 108 may also be included in the content analysis stage. At any rate the content analysis stage 103 comprises a second module 109 for scope creation by recognizing explicit format structures in the content and on this basis assigning summary value metrics (SVMs) to the scopes thus created. Additionally a third module 110 is provided in the content analysis stage 102 for scope creation from analysis of the content and on this basis assigning summary value metrics (SVMs) to the scopes thus created. As mentioned, above the core search engine 101, which actually here can be regarded as a representation of multiple distributed core search engines in fact comprises two further subsystems, namely the indexing subsystem 101a and the search subsystem 101b. For implementing the method according to the present invention the indexing subsystem 101a shall comprise a fourth module 111 for indexing scopes, values and SVMs. Finally it should be noted that the client API which handles both queries and results also, as known by persons skilled in the art, comprises means or modules for specifying queries, aggregations and navigators, and these will be suitably adapted to support the method according to the present invention.

The present invention discloses how such summary information can be associated with interactive objects for query refinements wherein the concept of relevance, previously applied to the result set only, is now also applied to the summary information and improves the perceived quality of a search engine or a search system as may be applied to information search and retrieval over data communication system generally, i.e. both extranets and intranets. Moreover, the present invention discloses how to increase query throughput in a distributed search engine by reducing the required network bandwidth. Thus the present invention represents a considerable improvement of the commonly applied methods in information access, search, and retrieval, as set out and detailed hereinabove.

The invention claimed is:

1. A method for computing summary information on documents, wherein the method comprises:
    identifying, by a computer, a result set of matching documents and query-dependent subsections of the matching documents by applying a query to a set of documents,
    computing summary information, the summary information comprising a plurality of aggregated summary value metrics (SVMs), each of the aggregated SVMs corresponding to a different attribute-value pair in a plurality of attribute-value pairs, each of the attribute-value pairs specifying a different value of a single attribute,
        wherein for each of the aggregated SVMs, the aggregated SVM for an attribute-value pair is a measure of a probability that, within a given scope within the matching documents, the attribute of the attribute-value pair has the value of the attribute-value pair; and
    displaying a graphical user interface object that presents the summary information to a user.

2. The method of claim 1, wherein each of the documents have an implicit and anonymous root element such that the documents effectively have a set of named elements and attributes.

3. The method of claim 1, further comprising performing an indexing time analysis of the set of documents to discover and encode elements of the documents, and assigning weights to the elements.

4. The method of claim 1, wherein the aggregated SVMs are based on at least in part on weights associated with different scopes, the scopes being in an ontology structure.

5. The method of claim 4, wherein the ontology structure is a taxonomy, and each of the aggregated SVMs gives the probability of the matching documents belonging to a taxonomy node in a plurality of taxonomy nodes, each of the taxonomy nodes representing a different one of the scopes.

6. The method of claim 4, the scopes are mapped through relations of the ontology structure to weight modifications associated with the relations of the ontology structure.

7. The method of claim 1, wherein computing the summary information comprises, using supervised or unsupervised clustering of selected document scopes to compute the summary information, taking weights associated with different scopes into account, the summary information responding to the probability of cluster membership.

8. The method of claim 1, wherein the graphical user interface object allows the user to select one of the aggregated SVMs as a query refinement in a single click.

9. The method of claim 1, wherein the aggregated SVMs are based at least in part on at least one of a relevance score within a query context and specifically a final relevance score of the matching documents in the result set; a presence or absence of named document scopes, or the values of named document scopes and associated weight of these values; if any.

10. The method of claim 1,
    wherein the aggregated SVMs are based at least in part on the relevance score within a query context,
    wherein the aggregated SVM are further based on one or more of:
        a token/word positional proximity in the matching documents between predicates in the query;
        a character positional proximity in the matching documents between predicates in the query;
        a number of matches in the matching documents, as selected by a subquery, between predicates in the query;
        an aggregation on the matches in the matching documents, as selected by a subquery, between predicates in the query;
        a semantic distance of tokens/words in an ontology;
        numeric values specified in the query and numeric values of scopes as selected by a sub-query, the numeric values including integers, real numbers, time, and geographical position; and
        a distance measure between a document vector specified in or implied by the query and a vector value being selected from the matching documents.

11. The method of claim 1, wherein generating the summary information comprises creating a contextual navigation by associating query refinements to the summary information, the query refinement including result set filtering and relevance boosting.

12. The method of claim 1, wherein the summary information comprises weighted frequency information.

13. The method of claim 12, wherein query predicates, a relevance calculation, an aggregation, or query refinements are defined at least partly in terms of one of Java™ source code or byte code, XPatch or XQuery, or ontology languages.

14. The method of claim 1, further comprising:
   identifying which document scopes are related to the query, and
   identifying dominant values for the identified document scopes, such that relevant facts and knowledge are enhanced.

15. The method of claim 14, further comprising presenting the identified scopes and the dominant values.

16. The method of claim 1, further comprising listing the most relevant scope and value associations are listed in an object presenting triples of scope value and weighted frequency ranked by decreasing weighted frequency across a set of named scopes.

17. The method of claim 1, further comprising subjecting the computation of the summary information to an error constraint, allowing the process to ignore some values in an early stage thereof.

18. The method of claim 1, further comprising computing the summary information of the highest ranked documents in the result set, and estimating an error in the summary information due to ignoring the other documents in the result set and returned in an error component of a summary object.

19. The method of claim 17 or claim 18, further comprising distributing the computation of the summary information over multiple processing units.

20. The method of claim 1, further comprising including co-occurrence statistics in the computation of the summary information.

21. The method of claim 20, further comprising presenting the co-occurrence statistics between two scopes as a two-dimensional heat map highlighting most relevant co-occurrence associations, and the co-occurrence statistics as a navigator on most relevant co-occurrence associations.

22. The method of claim 1, further comprising determining a popularity score for each of the aggregated SVMs, the popularity score being determined as a result of an analysis of content references and document actions.

23. The method of claim 1, wherein computing the summary information comprises determining the aggregated SVMs by an analysis of document actions in response to the result set of the query, including one or more of:
   presentation of documents in the result set;
   user views of documents in the result set;
   purchases of objects represented by documents in the result set;
   recommending objects represented by documents in the result set;
   reviewing object represented by documents in the result set;
   presentation of navigator entries in the result set; and
   user selection and query refinement of navigator entries.

* * * * *

UNITED STATES PATENT AND TRADEMARK OFFICE
CERTIFICATE OF CORRECTION

| | | |
|---|---|---|
| PATENT NO. | : 7,966,305 B2 | Page 1 of 1 |
| APPLICATION NO. | : 11/979607 | |
| DATED | : June 21, 2011 | |
| INVENTOR(S) | : Oystein Haug Olsen | |

It is certified that error appears in the above-identified patent and that said Letters Patent is hereby corrected as shown below:

In column 19, line 9, in Claim 14, delete "scopes." and insert -- scopes --, therefor.

Signed and Sealed this
Ninth Day of August, 2011

David J. Kappos
*Director of the United States Patent and Trademark Office*